(12) United States Patent
Ohashi et al.

(10) Patent No.: US 8,996,893 B2
(45) Date of Patent: Mar. 31, 2015

(54) POWER SUPPLY CIRCUIT FOR CONTROLLING POWER SUPPLY TO AN INTEGRATED CIRCUIT DEVICE WITH A RATE OF CHANGE OF POWER SUPPLY VOLTAGE BASED ON ACQUIRED VALUE OF CURRENT

(75) Inventors: Tsuyoshi Ohashi, Tokyo (JP); Shinji Takashima, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 419 days.

(21) Appl. No.: 13/376,528

(22) PCT Filed: Jun. 7, 2010

(86) PCT No.: PCT/JP2010/059618
§ 371 (c)(1),
(2), (4) Date: Jan. 6, 2012

(87) PCT Pub. No.: WO2010/143605
PCT Pub. Date: Dec. 16, 2010

(65) Prior Publication Data
US 2012/0110355 A1 May 3, 2012

(30) Foreign Application Priority Data

Jun. 8, 2009 (JP) .................. 2009-137710

(51) Int. Cl.
*G06F 1/00* (2006.01)
*H02M 3/156* (2006.01)
*G06F 1/32* (2006.01)
*H02M 1/00* (2006.01)

(52) U.S. Cl.
CPC ............. *H02M 3/156* (2013.01); *G06F 1/3203* (2013.01); *H02M 2001/0019* (2013.01); *H02M 2001/0025* (2013.01)
USPC ....................................... 713/300

(58) Field of Classification Search
None
See application file for complete search history.

(56) References Cited

U.S. PATENT DOCUMENTS 5,812,860 A * 9/1998 Horden et al. ................. 713/322
5,821,713 A * 10/1998 Holling et al. ........... 318/400.32
(Continued)

FOREIGN PATENT DOCUMENTS

| JP | 2005045853 A | 2/2005 |
| JP | 2006180603 A | 7/2006 |
| JP | 2008061420 A | 3/2008 |

OTHER PUBLICATIONS

International Preliminary Report on Patentability for corresponding application PCT/JP2010/059618, Jan. 17, 2012.
(Continued)

*Primary Examiner* — Thomas Lee
*Assistant Examiner* — Lin Lin Htay
(74) *Attorney, Agent, or Firm* — Matthew B. Dernier, Esq.; Gibson & Dernier LLP

(57) ABSTRACT

Provided is a power supply circuit capable of suppressing a power supply voltage to be input to an integrated circuit device to low level. A power supply circuit (10) controls power supply to an integrated circuit device (30) having a built-in IC chip (31). The power supply circuit (10) acquires a value of a current flowing in the integrated circuit device, and changes a power supply voltage to be input to the integrated circuit device (30), in accordance with the acquired value of the current.

7 Claims, 5 Drawing Sheets

(56) References Cited

U.S. PATENT DOCUMENTS

| | | |
|---|---|---|
| 7,400,126 B2 | 7/2008 | Iwashita |
| 7,441,137 B1* | 10/2008 | Mimberg .................... 713/340 |
| 2002/0019949 A1* | 2/2002 | Meynard .................... 713/300 |
| 2002/0144164 A1* | 10/2002 | Chen ........................... 713/320 |
| 2005/0018457 A1 | 1/2005 | Iwashita |
| 2006/0123256 A1* | 6/2006 | Cornelius .................. 713/300 |
| 2007/0174650 A1* | 7/2007 | Won et al. .................. 713/600 |
| 2008/0157742 A1* | 7/2008 | Martin et al. ............... 323/284 |
| 2008/0244284 A1* | 10/2008 | Karam et al. ............... 713/300 |
| 2009/0077402 A1* | 3/2009 | Huang et al. ............... 713/320 |
| 2010/0080043 A1* | 4/2010 | Hoffmann et al. .......... 365/149 |

OTHER PUBLICATIONS

Office Action for corresponding Chinese Patent Application No. 201080025366.4, dated Aug. 1, 2013.

Office Action for corresponding Japanese Patent Application No. 2011-518528, dated May 21, 2013.

International Search Report for corresponding application PCT/JP2010/059618, Aug. 24, 2010.

* cited by examiner

FIG.4

| CURRENT Iic(A) | TARGET VOLTAGE Vtg(V) |
|---|---|
| 0.9～1 | 1.20 |
| 0.8～0.9 | 1.19 |
| 0.7～0.8 | 1.18 |
| 0.6～0.7 | 1.17 |
| 0.5～0.6 | 1.16 |
| 0.4～0.5 | 1.15 |
| 0.3～0.4 | 1.14 |
| 0.2～0.3 | 1.13 |
| 0.1～0.2 | 1.12 |
| 0.0～0.1 | 1.11 |

POWER SUPPLY CIRCUIT FOR CONTROLLING POWER SUPPLY TO AN INTEGRATED CIRCUIT DEVICE WITH A RATE OF CHANGE OF POWER SUPPLY VOLTAGE BASED ON ACQUIRED VALUE OF CURRENT

TECHNICAL FIELD

The present invention relates to a power supply circuit and a power supply method for supplying power to an integrated circuit device.

BACKGROUND ART

Power supply is necessary to operate an integrated circuit device such as a central processing unit (CPU). Generally, in the integrated circuit device, a voltage to be input for its operation (device required voltage) is specified for each type or each individual device, and a power supply circuit performs such control that inputs a power supply voltage in accordance with the device required voltage to the integrated circuit device.

SUMMARY OF INVENTION

Usually, inside a package of the integrated circuit device, voltage drop occurs due to a wiring resistance between an input terminal to which the power supply voltage is input from the outside and an IC chip that actually performs calculation and other operations or due to a resistance within the IC chip. Based on such assumed voltage drop, the device required voltage of the integrated circuit device is therefore set higher than a voltage that is actually required for the operation of the IC chip (IC operating voltage). The voltage drop in this case is calculated on the assumption of a maximum consumption current (maximum current) that may flow in the integrated circuit device. However, the current flowing in the integrated circuit device fluctuates during the operation, and the integrated circuit device does not always operate with the maximum current. When the integrated circuit device operates with a small current, the above-mentioned voltage drop is reduced as compared to that with the maximum current and hence the IC chip is applied with a voltage higher than the IC operating voltage required for its operation. In other words, in a period in which a current smaller than the maximum current is flowing in the integrated circuit device, a power supply voltage higher than necessary is input to the integrated circuit device, and as a result, excessive power consumption or internal temperature rise in the integrated circuit device occurs. Note that, the temperature rise in the integrated circuit device is responsible for an increased leakage current in the integrated circuit device and leads to further increased power consumption.

The present invention has been made in view of the above-mentioned circumstances, and one of the objects thereof is to provide a power supply circuit and a power supply method, which are capable of suppressing a power supply voltage to be input to an integrated circuit device to low level.

According to the present invention, there is provided a power supply circuit for controlling power supply to an integrated circuit device having a built-in IC chip, including: current value acquiring section for acquiring a value of a current flowing in the integrated circuit device; and voltage control section for changing a power supply voltage to be input to the integrated circuit device, in accordance with the acquired value of the current.

In the above-mentioned power supply circuit, the voltage control section may determine an amount of the change of the power supply voltage with respect to a temporal change of the value of the current, based on information on a voltage that is preset as a power supply voltage intended to be input to the integrated circuit device and a maximum current that flows in the integrated circuit device.

Further, in the above-mentioned power supply circuit, the voltage control section may change the power supply voltage in different forms depending on whether the acquired value of the current has increased or decreased with time.

Still further, in the above-mentioned power supply circuit, when the acquired value of the current has decreased with time, the voltage control section may change the power supply voltage at a change rate slower than when the acquired value of the current has increased with time.

Further, according to the present invention, there is provided a power supply method of supplying power to an integrated circuit device having a built-in IC chip, including the steps of: acquiring a value of a current flowing in the integrated circuit device; and changing a power supply voltage to be input to the integrated circuit device, in accordance with the acquired value of the current.

BRIEF DESCRIPTION OF DRAWINGS

FIG. 4 A diagram illustrating an example of a table used for voltage control.

DESCRIPTION OF EMBODIMENT

Hereinafter, an embodiment of the present invention is described in detail with reference to the drawings.

Figure 1:
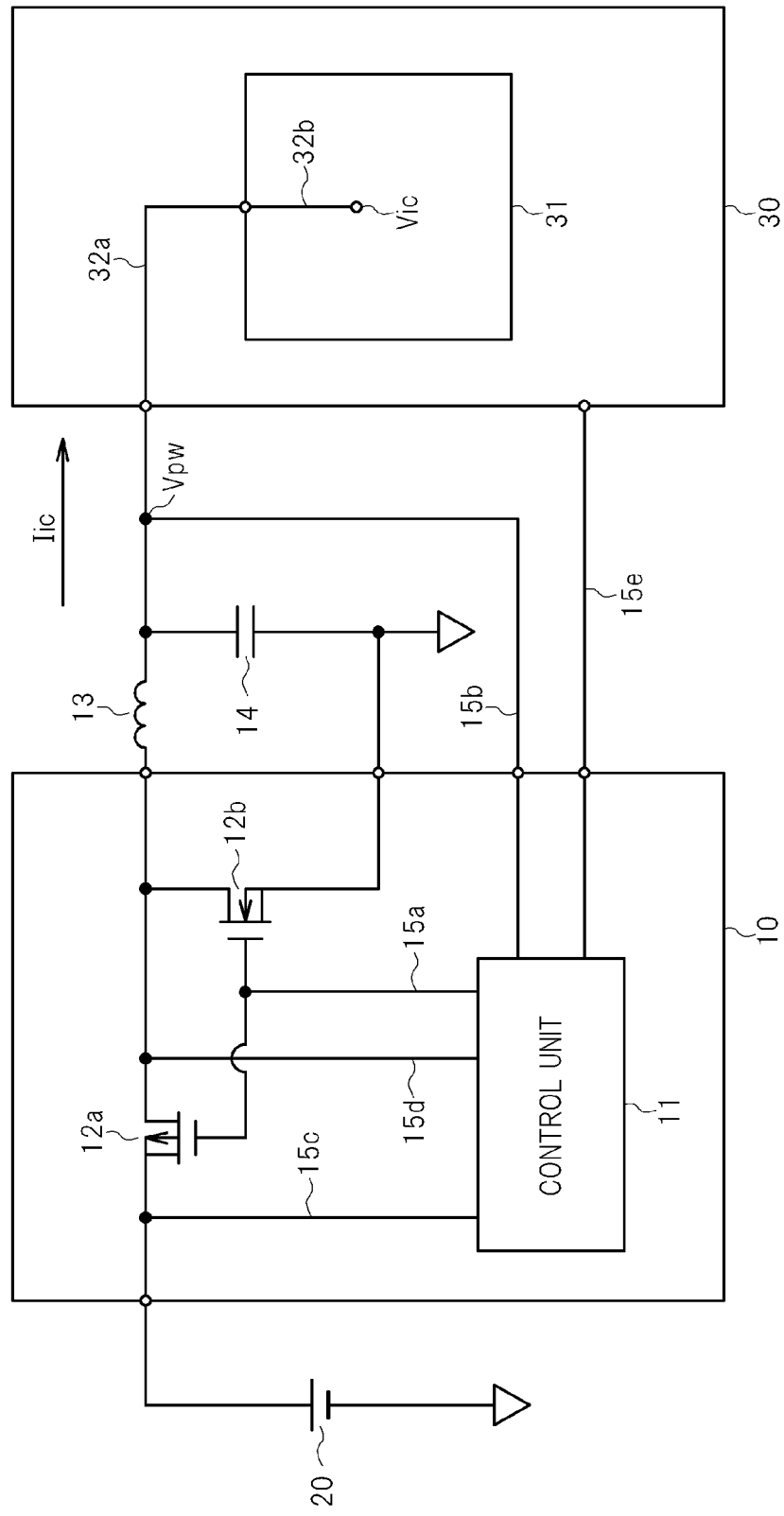
FIG. 1 A schematic configuration diagram of an electronic device including a power supply circuit according to an embodiment of the present invention.

FIG. 1 is a configuration diagram illustrating a schematic circuit configuration of an electronic device including a power supply circuit 10 according to an embodiment of the present invention. The power supply circuit 10 of this embodiment is, for example, a power supply IC that functions as a switching regulator, and as illustrated in FIG. 1, includes a control unit 11 and field effect transistors (FETs) 12a and 12b. Further, a secondary battery 20 is connected to the primary side of the power supply circuit 10, and an integrated circuit device 30 is connected to the secondary side thereof via an inductor 13 and a capacitor 14.

The power supply circuit 10, the inductor 13, and the capacitor 14 form a DC/DC converter as a whole. In other words, the control unit 11 executes control to switch ON/OFF of the FETs 12a and 12b periodically, and the inductor 13 and the capacitor 14 smooth a voltage output from the power supply circuit 10, to thereby convert a voltage input from the secondary battery 20 to a preset target voltage Vtg, which is input to the integrated circuit device 30.

Note that, the secondary battery 20 is used herein as a power supply source, but the power supply source for the power supply circuit 10 is not limited thereto and may be, for example, a commercial AC power supply input from outside the electronic device. In this case, the AC power supply is converted into a DC power supply by a rectifier circuit or the like that is disposed on the primary side of the power supply circuit 10. Details of the control executed by the control unit 11 for inputting the target voltage Vtg to the integrated circuit device 30 are described later.

The integrated circuit device 30 is an electronic component that is constituted by an IC chip 31 and a package incorporating the IC chip 31. The following description exemplifies the case where the integrated circuit device 30 is a CPU, but the integrated circuit device 30 is not limited thereto.

Figure 2:
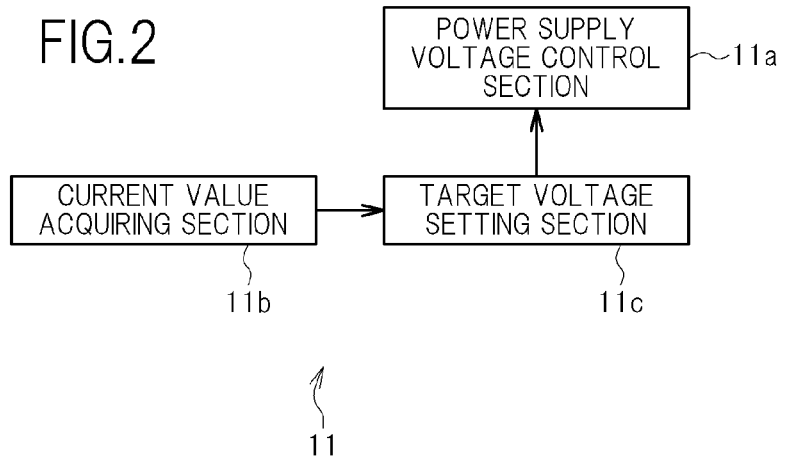
FIG. 2 A functional block diagram illustrating the functions of a control unit.

Hereinafter, the control to be executed by the control unit 11 included in the power supply circuit 10 in this embodiment is described. As illustrated in FIG. 2, the control unit 11 functionally includes a power supply voltage control section 11a, a current value acquiring section 11b, and a target voltage setting section 11c.

The power supply voltage control section 11a controls ON/OFF of the FETs 12a and 12b via wiring 15a, thereby controlling a power supply voltage Vpw input to the integrated circuit device 30 to the target voltage Vtg. Specifically, the power supply voltage control section 11a acquires via wiring 15b a value of the power supply voltage Vpw input to the integrated circuit device 30. The power supply voltage control section 11a then performs control of switching ON/OFF of the FETs 12a and 12b so that the acquired value of the power supply voltage Vpw may approximate the target voltage Vtg. The control executed by the power supply voltage control section 11a may be such kind of control that is generally executed in a switching regulator.

The current value acquiring section 11b acquires a value of a current Iic flowing from the secondary battery 20 through the power supply circuit 10 to the integrated circuit device 30. The current Iic fluctuates during the operation of the integrated circuit device 30 in accordance with its operating state. For example, the current Iic increases in a period in which the integrated circuit device 30 is executing high-load arithmetic processing, and the current Iic decreases during a standby period for waiting an input from a user or in other similar cases. Accordingly, the current value acquiring section 11b repeats the acquisition of the current value regularly in short cycles during the operation of the integrated circuit device 30 (namely, during power supply to the integrated circuit device 30), to thereby monitor a temporal change of the current Iic flowing in the integrated circuit device 30.

Specifically, the current value acquiring section 11b acquires via wiring 15c and 15d respective voltage values across the FET 12a. Then, the difference between the two acquired voltage values (namely, a potential difference across the FET 12a) is calculated. Further, from a pre-stored characteristic curve of the FET 12a, a current value of the FET 12a corresponding to the calculated potential difference is calculated. By executing the process described above continuously to perform time integration of the calculated current values, a value of the current Iic flowing in the integrated circuit device 30 per unit time can be calculated. Note that, the acquisition method for a current value as used herein is merely an example, and the current value acquiring section 11b may acquire a value of the current Iic flowing in the integrated circuit device 30 by another method. Further, the current value acquiring section 11b may acquire as the value of the current Iic a current value at another point on a power supply path than the point of the FET 12a. As a specific example, the current value acquiring section 11b may acquire the value of the current Iic by measuring the magnitude of a current flowing through the inductor 13.

The target voltage setting section 11c uses the value of the current Iic acquired by the current value acquiring section 11b to set a value of the target voltage Vtg that the power supply voltage control section 11a uses. Specifically, the target voltage setting section 11c changes the value of the target voltage Vtg in accordance with the temporal change of the current Iic flowing in the integrated circuit device 30. Through this control, the power supply voltage Vpw to be input to the integrated circuit device 30 is adjusted in accordance with the temporal change of the current Iic flowing in the integrated circuit device 30.

Specifically, when the integrated circuit device 30 starts its operation, the target voltage setting section 11c first acquires information related to a device required voltage Vpk, an IC operating voltage Vic, and a maximum current Imax from the integrated circuit device 30 via wiring 15e. Here, the IC operating voltage Vic is a voltage that is actually required for the IC chip 31 included in the integrated circuit device 30 to operate. The device required voltage Vpk is, on the other hand, a voltage that is prescribed as the power supply voltage Vpw intended to be input to the integrated circuit device 30, and is set to a value determined by adding to the IC operating voltage Vic an amount of voltage drop that is assumed to occur in the integrated circuit device 30. Further, the maximum current Imax is a value of a maximum consumption current that is assumed to flow in the integrated circuit device 30. Note that, as described above, the device required voltage Vpk is a value determined by adding to the IC operating voltage Vic an amount of voltage drop that occurs when the maximum current Imax flows in the integrated circuit device 30.

Note that, the values of Vpk, Vic, and Imax may be values that are determined depending on the type of the integrated circuit device 30 on standard, or may be values that are measured for each individual integrated circuit device 30 in consideration of the device individual differences and written in advance in the integrated circuit device 30 before shipment. Further, the device required voltage Vpk and the maximum current Imax may be values that change in accordance with the operating frequency of the integrated circuit device 30 as a CPU. For example, in the case where the integrated circuit device 30 is a CPU that operates at any one of a plurality of operating frequencies in accordance with a program to be executed or the like, the maximum current Imax increases when the CPU operates at a high frequency and the device required voltage Vpk also increases correspondingly. When the CPU operates at a relatively low frequency, on the other hand, the maximum current Imax as well as the device required voltage Vpk decreases.

Here, an internal resistance that is assumed to be responsible for causing voltage drop inside the integrated circuit device 30 is represented by R. Specifically, the resistance R is a resistance of wiring 32a from an input terminal to which the power supply voltage Vpw is input to the IC chip 31, a resistance of wiring 32b inside the IC chip 31 to a circuit element to be supplied with the IC operating voltage Vic, and the like. Using the resistance R, the relationship of:

$$Vpk=Vic+R \cdot Imax$$

is considered to be established between Vpk and Vic. Accordingly, from the acquired values of Vpk, Vic, and Imax, the value of the resistance R can be calculated by the following calculation formula.

$$R=(Vpk-Vic)/Imax$$

In a period in which the value of the current Iic acquired by the current value acquiring section 11b is below the maximum current Imax, the voltage drop caused by the resistance R becomes smaller than R·Imax. It follows that it is only necessary to input the power supply voltage Vpw smaller than Vpk to the integrated circuit device 30 for supplying the IC operating voltage Vic to the circuit element in the IC chip 31. Accordingly, the target voltage setting section 11c sets the target voltage Vtg lower than the device required voltage Vpk that is actually required by the integrated circuit device 30, in accordance with the value of the current Iic acquired by the current value acquiring section 11b. With this setting, waste power consumption or heat generation by the integrated circuit device 30 can be suppressed.

As a specific example, the target voltage Vtg to be set is calculated by the following calculation formula.

$$Vtg=Vic+Iic\cdot R$$

Here, Iic is assumed to fluctuate in the range from 0 to Imax, and hence the target voltage Vtg is set in the range with a lower limit of Vic and an upper limit of Vpk. Further, the target voltage Vtg is calculated as a linear function of Iic, with the value of the resistance R determined based on the information on Vpk, Vic, and Imax being a constant of proportionality. In other words, the value of the resistance R indicates a change amount of the target voltage Vtg with respect to the temporal change of the current Iic.

In addition, the target voltage Vtg may be a value determined by further adding a predetermined correction value α to the value calculated by the above-mentioned calculation formula. In this case, the target voltage Vtg is calculated by the following calculation formula.

$$Vtg=Vic+Iic\cdot R+\alpha$$

The correction value α in this example is a value determined in consideration of a measurement error of the current Iic. The value of the current Iic that the current value acquiring section 11b acquires may contain a measurement error. Then, if an actually measured value of the current Iic becomes smaller than a true value due to such measurement error, there is a fear that the target voltage Vtg is calculated to be smaller than a voltage necessary for normally operating the IC chip 31. Accordingly, in this example, a correction value α is added to the target voltage Vtg in order that the target voltage Vtg may be a voltage sufficient for operating the IC chip 31 even if the measurement value of the current Iic deviates from the true value. Specifically, the correction value α may be, for example, a value calculated by multiplying the voltage drop value Vdrop by a predetermined ratio. Alternatively, the correction value α may be a value calculated based on the resistance R in consideration of a resolution of current detection or an overshoot of a detected current. Further, the correction value α may be a value obtained by combining numerical values calculated by such various kinds of methods.

Next, an example of the processing flow executed by the control unit 11 in this embodiment is described with reference to the flowchart of FIG. 3.

When a user turns on a power button or the like to externally input a control instruction of operation start, the power supply voltage control section 11a first starts power supply to the integrated circuit device 30, with a pre-specified initial value set as the target voltage Vtg (S1). Subsequently, the target voltage setting section 11c acquires information on the device required voltage Vpk, the IC operating voltage Vic, and the maximum current Imax from the integrated circuit device 30 (S2), and changes the value of the target voltage Vtg to the acquired device required voltage Vpk (S3). In response to the change, the power supply voltage control section 11a first performs control to input the device required voltage Vpk to the integrated circuit device 30. Subsequently, the target voltage setting section 11c uses the information acquired in S2 to calculate a value of the resistance R based on the above-mentioned calculation formula (S4).

After that, control in accordance with the value of the current Iic is started. In other words, the current value acquiring section 11b acquires the value of the current Iic flowing in the integrated circuit device 30 (S5), and the target voltage setting section 11c uses the acquired current Iic and the value of the resistance R calculated in S4 to update the value of the target voltage Vtg (S6). Then, it is determined whether or not a control instruction to power off has been input (S7). When it is determined in S7 that the control instruction of powering-off has not been input, the processing returns to S5 and is repeated.

Note that, in the example of the flow of the figure, initialization processing in S2 to S4 for voltage control in accordance with the current value is executed at timing of power on, but the timing is not limited thereto, and similar initialization processing may be executed also during the operation of the integrated circuit device 30 if necessary. For example, in the case where the integrated circuit device 30 is a CPU that operates at any one of a plurality of operating frequencies as described above, the integrated circuit device 30 often changes its own operating mode in the middle of operation in accordance with an execution request of an application program or the like. In this case, the integrated circuit device 30 outputs values of the device required voltage Vpk and the maximum current Iic corresponding to a new operating mode. In response thereto, the target voltage setting section 11c may recalculate the resistance R and, based on the newly calculated value of the resistance R, execute subsequent voltage control.

According to this embodiment described above, the power supply circuit 10 changes the power supply voltage Vpw input to the integrated circuit device 30, in accordance with the value of the current Iic flowing in the integrated circuit device 30, and hence in a period in which the current Iic is smaller than the maximum current Imax, the power supply voltage Vpw can be suppressed to be lower than the device required voltage Vpk, thus suppressing unnecessary power consumption and heat generation.

Note that, the target voltage setting section 11c may calculate the target voltage Vtg by a method described below instead of the method described above. That is, when the value of the maximum current Imax is acquired, the possible numerical range of Iic from 0 to Imax is divided into a plurality of numerical ranges in advance. Then, a value of the target voltage Vtg to be input in accordance with an upper limit current value of each numerical range is calculated by the above-mentioned calculation formula. A table indicating the correspondence relation between the thus obtained numerical range of Iic and the target voltage Vtg to be set is stored in a memory area of the power supply circuit 10. In this case, how many numerical ranges the range of possible values of the current Iic are divided into may be determined in accordance with the magnitude of the value of (Vpk-Vic) and with the degree of resolution with which the target voltage Vtg can be controlled in terms of circuit configuration. For example, in the case of a mode where the integrated circuit device 30 operates at a high operating frequency, the value of Vpk increases as well, and hence the possible range of values of the current Iic may be divided more finely.

FIG. 4 is a diagram illustrating an example of such table. The figure illustrates an example of the case where the possible range of values of the current Iic is divided into ten, with Vic=1.10 V, Vpk=1.20 V, the maximum current Imax=1 A, and the resistance R=0.1Ω. Then, after the start of operation of the integrated circuit device 30, every time the current value acquiring section 11b acquires a new value of the current Iic, the target voltage setting section 11c sets a voltage value corresponding to a numerical range to which the acquired value of Iic belongs as a new value of the target voltage Vtg.

Further, the target voltage setting section 11c may change the target voltage Vtg in different forms depending on whether the current Iic has increased or decreased with time. For example, when the current Iic has increased with time, the voltage drop inside the integrated circuit device 30 also increases correspondingly, and hence it is necessary to raise the power supply voltage Vpw immediately in order to supply the IC operating voltage Vic into the IC chip 31. When the current Iic has decreased, on the other hand, considering a case where merely a small current Iic flows instantaneously, it may be preferred to reduce the target voltage Vtg after a given period of time, rather than reduce the power supply voltage Vpw immediately. Accordingly, for example, in the case where the value of the current Iic is included in a numerical range that is lower than a numerical range corresponding to the current target voltage Vtg among the above-mentioned plurality of numerical ranges for a given period of time or longer, the target voltage setting section 11c may change the target voltage Vtg to a voltage value corresponding to the lower numerical range.

Figure 5:
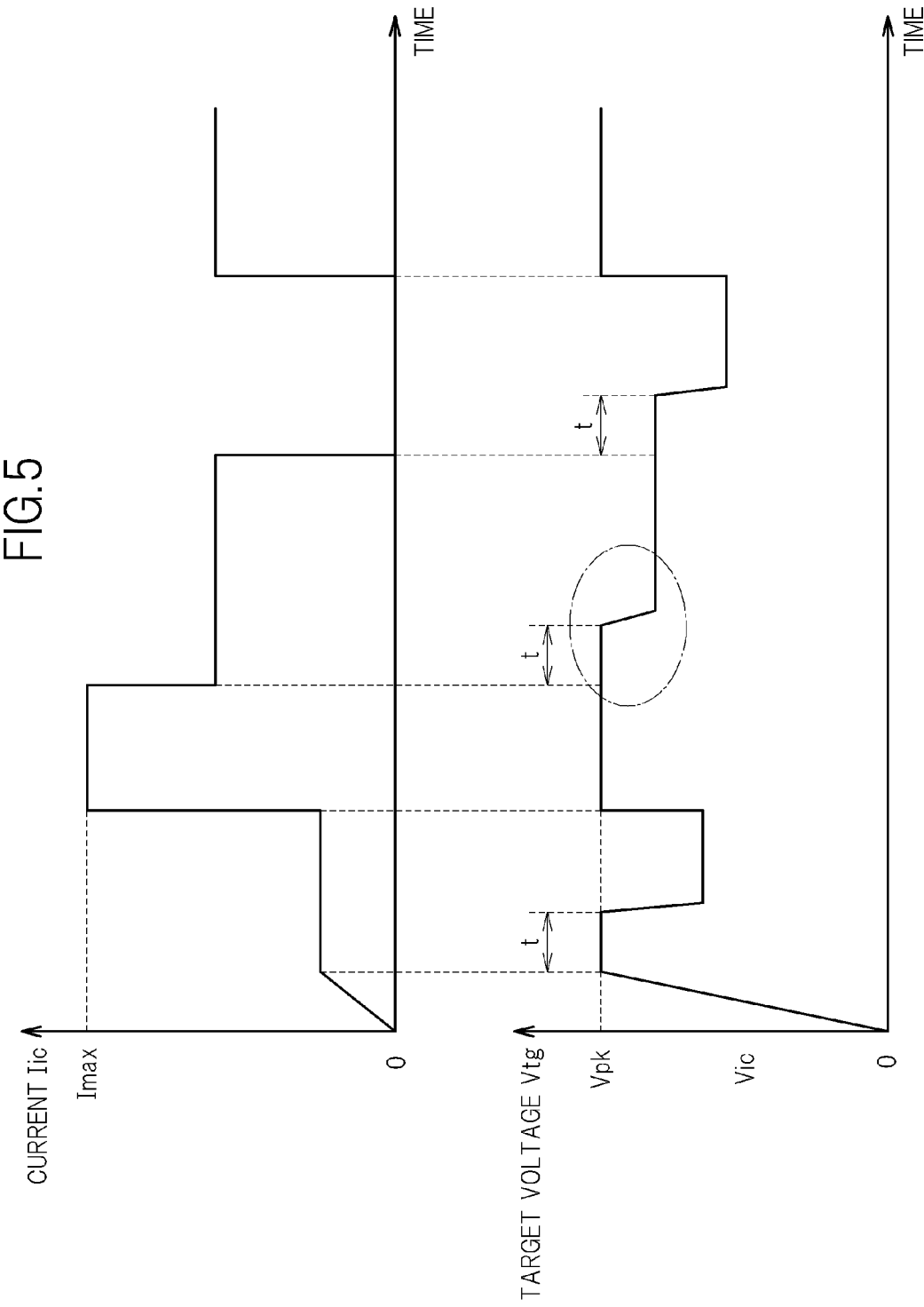
FIG. 5 A graph illustrating an example of temporal changes of a current flowing in an integrated circuit device and a target voltage.

FIG. 5 is a graph schematically illustrating the correspondence relation between a temporal change of the current Iic and a temporal change of the target voltage Vtg that is set by the target voltage setting section 11c in accordance with the temporal change of the current Iic in the case where the control described above is executed. In FIG. 5, the upper graph illustrates the temporal change of the current Iic and the lower graph illustrates the temporal change of the target voltage Vtg, in both of which the horizontal axis corresponds to time. In the example of the figure, when the current Iic has increased, the target voltage Vtg also rises immediately, but when the current Iic has decreased, the target voltage Vtg is decreased after a predetermined period of time t.

Further, when the current Iic has decreased with time, the target voltage setting section 11c may change the target voltage Vtg at a change rate slower than a change rate of the target voltage Vtg for when the current Iic has increased. If the target voltage Vtg is changed instantaneously, the current Iic greatly fluctuates and an overshoot occurs easily. Accordingly, there is a fear that it becomes difficult to measure the current Iic with accuracy unless the power supply voltage Vpw becomes stable after the change of the target voltage Vtg. As a countermeasure, the power supply circuit 10 changes the target voltage Vtg gradually, thereby avoiding such abrupt fluctuation of the current Iic. Specifically, in the case of decreasing the target voltage Vtg, for example, the target voltage setting section 11c may decrease the target voltage Vtg by a predetermined unit amount vu (such as 10 mV) every predetermined unit time t2 (such as 2 ms). This control is repeated until the target voltage Vtg finally becomes a value calculated by the above-mentioned calculation formula using the measurement value of the current Iic. The unit amount vu as used herein may be a value corresponding to a minimum step size of the target voltage Vtg with which the power supply voltage control section 11a is controllable. Note that, even during this control, the power supply circuit 10 repeatedly executes the measurement of the current Iic, and when the result show that the value of the current Iic has risen, the power supply circuit 10 recalculates the target voltage Vtg by using the raised value of the current Iic. Then, in the case of raising the target voltage Vtg, unlike the case of decreasing, the target voltage Vtg is changed to the recalculated value immediately. According to this control, when the current Iic has decreased, the change rate of the power supply voltage Vpw supplied to the integrated circuit device 30 becomes slower than that when the current Iic has increased.

Figure 6:
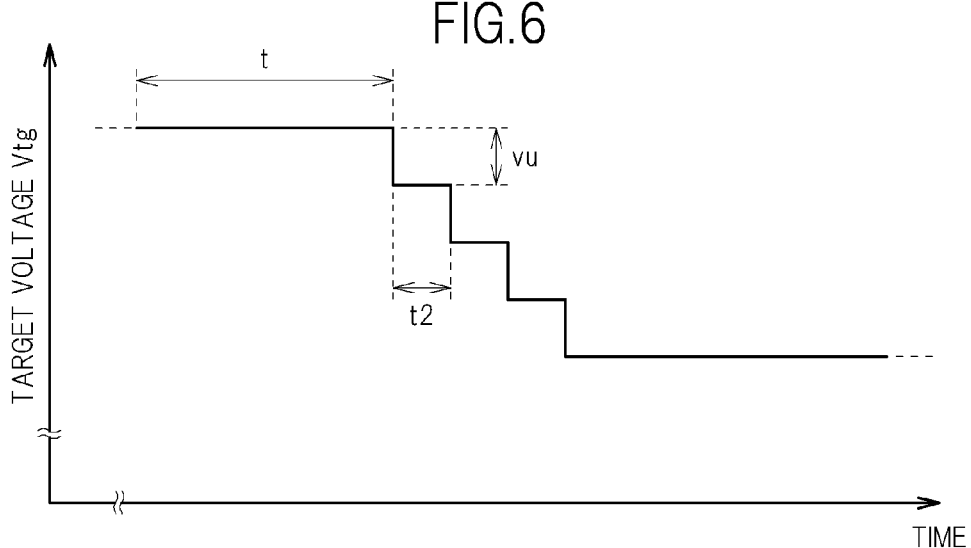
FIG. 6 A partially enlarged graph of FIG. 5.

FIG. 6 is a graph illustrating an example of such control of the target voltage Vtg, enlarging a part indicated by the dashed-line ellipse of FIG. 5. In the figure, after detecting that the current Iic has lowered, the target voltage setting section 11c first maintains the target voltage Vtg without any change until a predetermined time t has elapsed. After that, the target voltage setting section 11c lowers the target voltage Vtg by the unit amount vu every time the unit time t2 has elapsed.

Note that, in the above description, the power supply circuit 10 acquires information on the device required voltage Vpk, the IC operating voltage Vic, and the maximum current Imax from the integrated circuit device 30, and calculates the value of the resistance R from those values, but the embodiment of the present invention is not limited thereto. For example, as long as the integrated circuit device 30 holds the value of the resistance R, the power supply circuit 10 may acquire the value of the resistance R directly from the integrated circuit device 30, and in this case, information on the device required voltage Vpk and the maximum current Imax is not always necessary. Further, some or all of the device required voltage Vpk, the IC operating voltage Vic, the maximum current Imax, and the resistance R may be stored in the power supply circuit 10 in advance.

Further, the power supply circuit 10 may acquire parameters other than the parameters described above from the integrated circuit device 30, and control the target voltage Vtg based on the acquired parameters. As a specific example, the power supply circuit 10 may acquire from the integrated circuit device 30, instead of the IC operating voltage Vic, a voltage drop value Vdrop indicating voltage drop that occurs in the integrated circuit device 30 when the maximum current Imax flows. The voltage drop value Vdrop as used herein represents the difference between the device required voltage Vpk and the IC operating voltage Vic. That is, the relationship of:

$$Vpk-V\text{drop}=Vic$$

is established. An example of the processing flow that the control unit 11 executes in this case is described with reference to the flowchart of FIG. 7.

Figure 7:
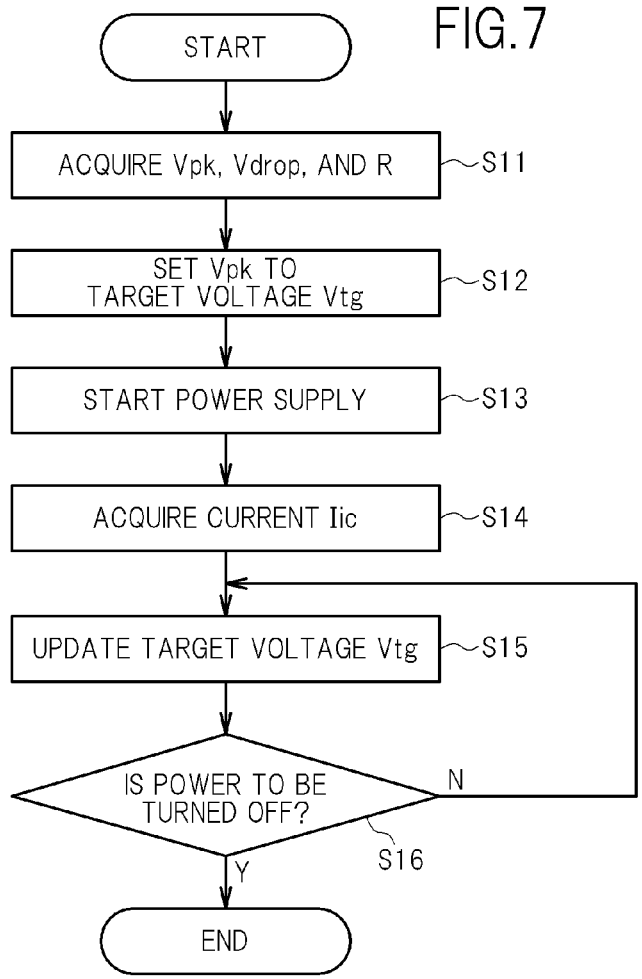
FIG. 7 A flowchart illustrating another example of the flow of processing executed by the power supply circuit according to the embodiment of the present invention.

In the flow of FIG. 7, the target voltage setting section 11c first acquires information on the device required voltage Vpk, the voltage drop value Vdrop, and the resistance R from the integrated circuit device 30 (S11). Next, the power supply voltage control section 11a sets the target voltage Vtg as the device required voltage Vpk acquired in S11 (S12), and starts power supply to the integrated circuit device 30 with the target voltage Vtg (S13).

Figure 3:
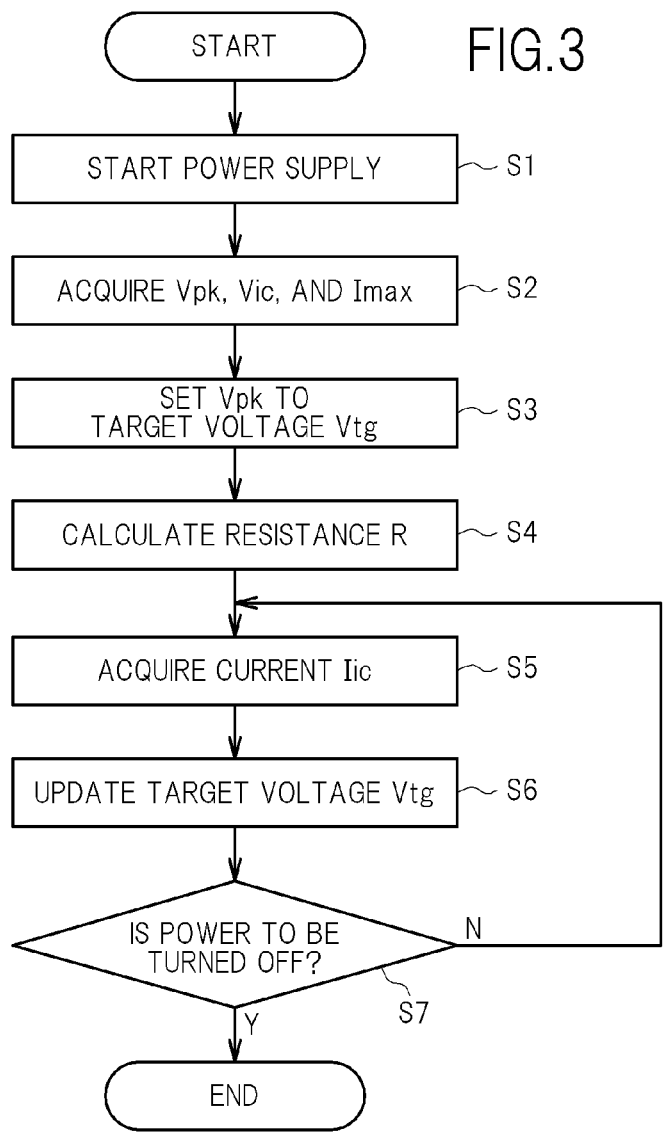
FIG. 3 A flowchart illustrating an example of the flow of processing executed by the power supply circuit according to the embodiment of the present invention.

After that, by the same procedure as that from S5 to S7 in the flow of FIG. 3, control in accordance with a value of the current Iic is executed. In other words, the current value acquiring section 11b acquires the value of the current Iic flowing in the integrated circuit device 30 (S14), and the target voltage setting section 11c uses the acquired current Iic and the values of the respective parameters acquired in S11 to update the value of the target voltage Vtg (S15). Then, it is determined whether or not a control instruction to turn off power has been input (S16). When it is determined in S16 that the control instruction for power-off has not been input, the flow returns to S14 and the processing is repeated.

However, in the flow of FIG. 7, in S15, the value of the target voltage Vtg is determined by a calculation formula different from that in the case of FIG. 3. Specifically, Vtg is calculated by the following calculation formula based on the device required voltage Vpk, the voltage drop value Vdrop, and the resistance R that are acquired in S11.

$$Vtg = Vpk - Vdrop + R \cdot Iic + \alpha$$

where α is the same correction value as in the above-mentioned example.

Note that, similarly to the example of the flow of FIG. 3, the power supply circuit 10 may acquire the value of the maximum current Imax instead of the resistance R. In this case, the resistance R can be calculated by the following calculation formula.

$$R = Vdrop / Imax$$

Further, in the example of the flow of FIG. 7, the resistance R is also acquired from the integrated circuit device 30 similarly to the device required voltage Vpk and the like, but if there are little fluctuations in the resistance R due to the individual differences of the integrated circuit device 30, the value of the resistance R may be written in the power supply circuit 10 in advance as a fixed value.

The invention claimed is:

1. A power supply circuit for controlling power supply to an integrated circuit device having a built-in IC chip, comprising:
   current value acquiring section for acquiring a value of a current flowing in the integrated circuit device; and
   voltage control section for changing a power supply voltage to be input to the integrated circuit device, in accordance with the acquired value of the current, such that a rate of change of the power supply voltage differs depending on whether the acquired value of the current has increased or decreased with time.

2. The power supply circuit according to claim 1, wherein the voltage control section determines an amount of the change of the power supply voltage with respect to a temporal change of the value of the current, based on information on a voltage that is preset as a power supply voltage intended to be input to the integrated circuit device and a maximum current that flows in the integrated circuit device.

3. The power supply circuit according to claim 2, wherein the voltage control section determines the power supply voltage in accordance with the following expression: Vpw(t) is proportional to Vic +Iic(t)×(Vpk−Vic)/Imax, where Vpw(t) is the power supply voltage produced by the voltage control section as a function of time,
Vic is the voltage that is preset as a power supply voltage intended to be input to the integrated circuit device,
Iic(t) is the value of the current flowing in the integrated circuit device as a function of time,
Vpk is a peak operating voltage of the integrated circuit device, and
Imax is the maximum current that flows in the integrated circuit device.

4. The power supply circuit according to claim 1, wherein, when the acquired value of the current has decreased with time, the voltage control section sets the rate of change to be slower than when the acquired value of the current has increased with time.

5. A power supply method of supplying power to an integrated circuit device having a built-in IC chip, comprising the steps of:
   acquiring a value of a current flowing in the integrated circuit device; and
   changing a power supply voltage to be input to the integrated circuit device, in accordance with the acquired value of the current, such that a rate of change of the power supply voltage differs depending on whether the acquired value of the current has increased or decreased with time.

6. A power supply circuit for controlling power supply to an integrated circuit device having a built-in IC chip, comprising:
   current value acquiring section for acquiring a value of a current flowing in the integrated circuit device; and
   voltage control section for changing a power supply voltage to be input to the integrated circuit device, in accordance with the acquired value of the current, wherein the voltage control section determines a rate of change of the power supply voltage with respect to a temporal change of the value of the current, based on information on a voltage that is preset as a power supply voltage intended to be input to the integrated circuit device and a maximum current that flows in the integrated circuit device.

7. The power supply circuit according to claim 6, wherein the voltage control section determines the power supply voltage in accordance with the following expression: Vpw(t) is proportional to Vic +Iic(t)×(Vpk−Vic)/Imax, where Vpw(t) is the power supply voltage produced by the voltage control section as a function of time,
Vic is the voltage that is preset as a power supply voltage intended to be input to the integrated circuit device,
Iic(t) is the value of the current flowing in the integrated circuit device as a function of time,
Vpk is a peak operating voltage of the integrated circuit device, and Imax is the maximum current that flows in the integrated circuit device.

* * * * *